(12) United States Patent
Woodmansee et al.

(10) Patent No.: US 10,721,130 B2
(45) Date of Patent: Jul. 21, 2020

(54) UPGRADE/DOWNTIME SCHEDULING USING END USER SESSION LAUNCH DATA

(71) Applicant: Citrix Systems, Inc., Fort Lauderdale, FL (US)

(72) Inventors: Kevin Woodmansee, Lighthouse Point, FL (US); Leo C. Singleton, IV, Fort Lauderdale, FL (US); Sam Arun Seeniraj, Fort Lauderdale, FL (US); Jitendra Deshpande, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 288 days.

(21) Appl. No.: 15/594,892

(22) Filed: May 15, 2017

(65) Prior Publication Data
US 2018/0331918 A1    Nov. 15, 2018

(51) Int. Cl.
| | |
|---|---|
| *H04L 12/24* | (2006.01) |
| *H04L 29/06* | (2006.01) |
| *G06F 16/2458* | (2019.01) |
| *H04L 29/08* | (2006.01) |
| *G06F 16/23* | (2019.01) |
| *G06F 8/65* | (2018.01) |
| *G06F 9/451* | (2018.01) |

(52) U.S. Cl.
CPC ............ *H04L 41/0893* (2013.01); *G06F 8/65* (2013.01); *G06F 16/23* (2019.01); *G06F 16/2465* (2019.01); *H04L 41/046* (2013.01); *H04L 41/082* (2013.01); *H04L 63/10* (2013.01); *H04L 67/08* (2013.01); *G06F 9/452* (2018.02); *H04L 63/0272* (2013.01)

(58) Field of Classification Search
CPC . H04L 41/145; H04L 41/082; H04L 41/0853; H04L 41/0873; H04L 41/0893; H04L 63/10; H04L 67/08; H04L 41/046; G06F 17/30539; G06G 16/2465; G06G 16/23; G06G 8/65; G06G 9/452
See application file for complete search history.

(56) References Cited

U.S. PATENT DOCUMENTS

| | | | |
|---|---|---|---|
| 7,254,779 B1 * | 8/2007 | Rezvani ............... | G06F 3/0481 715/719 |
| 7,974,849 B1 * | 7/2011 | Begole ............... | G06Q 10/0631 705/1.1 |
| 8,713,562 B2 * | 4/2014 | Dain ..................... | G06F 8/60 717/178 |
| 2004/0039630 A1 * | 2/2004 | Begole ................. | G06Q 10/10 705/320 |

(Continued)

*Primary Examiner* — Thomas J Dailey
*Assistant Examiner* — Aye M Aung
(74) *Attorney, Agent, or Firm* — Banner & Witcoff, Ltd.

(57) ABSTRACT

Methods, systems, computer-readable media, and apparatuses for updating a multi-tenant virtualization system are described herein. Session launch data for a plurality of end users associated with a plurality of tenants is obtained from a session database, and queried. The session launch data is analyzed for session launch activity. An update time is obtained based on the analysis. A component of the multi-tenant virtualization system is updated at the determined update time. During the updating, new sessions by the plurality of end users associated with the plurality of tenants are prevented from launching.

18 Claims, 11 Drawing Sheets

(56) References Cited

U.S. PATENT DOCUMENTS

| | | | |
|---|---|---|---|
| 2013/0074061 A1* | 3/2013 | Averbuch | G06F 8/654 717/171 |
| 2013/0227699 A1* | 8/2013 | Barak | H04L 63/10 726/26 |
| 2014/0006237 A1* | 1/2014 | Chiang | G06Q 30/04 705/34 |
| 2015/0012624 A1* | 1/2015 | Geiger | H04L 41/082 709/221 |
| 2015/0379296 A1* | 12/2015 | Chang | G06F 17/30345 707/785 |
| 2016/0127463 A1* | 5/2016 | Kostrzewa | G06F 16/23 709/203 |
| 2017/0031671 A1* | 2/2017 | Joshi | G06F 8/654 |
| 2017/0357495 A1* | 12/2017 | Crane | G06F 8/65 |
| 2017/0371641 A1* | 12/2017 | Spieler | G06F 8/65 |
| 2018/0287925 A1* | 10/2018 | Wik | H04L 43/16 |

* cited by examiner

UPGRADE/DOWNTIME SCHEDULING USING END USER SESSION LAUNCH DATA

FIELD

Aspects of the disclosure relate to computer hardware and software. In particular, one or more aspects of the disclosure generally relate to computer hardware and software for providing upgrade or downtime scheduling of a cloud-based virtualization system that provides access to one or more applications, to minimize negative effects on users attempting to access the one or more applications from their user devices.

BACKGROUND

Virtual desktops provide access to applications, such as Microsoft WORD stored in a public or private cloud, to remote users, who can access the applications via a virtual desktop infrastructure such as XENDESKTOP or XENAPP, by Citrix Systems, Inc. of Ft. Lauderdale, Fla. This allows users to work from various locations, such as a location that is not the user's home or office, due to the centralized nature of the application that is being accessed by the users.

For example, XENDESKTOP manages and delivers applications to a user by supporting hypervisors, to create virtual machines to run applications and desktops for the user. Using XENAPP, any type of application on a WINDOWS Operating System (OS) by Microsoft Corporation of Redmond Wash.) or a Linux Operating System OS, running on a public cloud, a private cloud, or a hybrid (e.g., partially public and partially private) cloud, can be centrally managed and delivered on-demand to many different users worldwide. Using XENDESKTOP, any type of application or server-hosted desktop on a WINDOWS or Linux OS, running on a public cloud, a private cloud, or a hybrid cloud, can be centrally managed and delivered on-demand to many different users worldwide.

One issue with respect to virtual environments that affect one or more remote users at different locations is performing upgrades at times that have as minimal effect on users as possible, since users that are adversely affected by downtimes when upgrades are being performed may become upset and thus unwilling to use such services in the future.

SUMMARY

Aspects of the disclosure relate to various systems and techniques that provide efficient upgrade or update times for a virtualization system that provides access to one or more applications stored in a central location, such as a cloud, for access by one or more users, to provide as minimal as possible deleterious effects on the users desiring access to the application(s).

For example, some embodiments discussed in greater detail below monitor session launch data from a plurality of users accessing one or applications stored in a central location via a virtualization system, such as by way of a private cloud, a public cloud, or a hybrid cloud, and determine the optimal time or times to perform upgrades or updates on at least one component of the virtualization system that provides to the plurality of users access to the one or more applications, whereby each upgrade or update results in at least some amount of downtime due to users being unable to start new sessions to access the one or more applications until each upgrade or update has completed.

By leveraging various aspects of these techniques and/or the other features and functionalities discussed in more detail below, greater convenience, functionality, and ease-of-use may be provided to users of a virtualization system, particularly in situations where such users wish to access, via the user's device, a desktop hosted on a server or an application hosted on the server.

Some embodiments discussed in greater detail below monitor location data of a plurality of users accessing particular applications stored hosted on one or more servers, monitor usage data of the particular applications with respect to the plurality of users over a particular time period, and assign subsets of the users to particular servers of the one or more servers, in which each subset of users assigned to a particular server of the one or more servers is determined based on location data of the servers and location data of the users, to minimize a geographic distance of users with respect to servers being accessed by the users.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of □including□ and □comprising□ and variations thereof is meant to encompass the items listed thereafter and equivalents thereof as well as additional items and equivalents thereof.

As noted above, certain embodiments are discussed herein that relate to providing a native desktop (e.g., on a client device, such as a mobile device) using cloud-synchronized data, which may include data that has been mined (e.g., extracted, analyzed, and/or selectively stored) from another desktop remote from the native desktop provided on the client device. Before discussing these concepts in greater detail, however, several examples of computing architecture and enterprise mobility management architecture that may be used in implementing and/or otherwise providing various aspects of the disclosure will first be discussed with respect to FIGS. 1-4.

Figure 1:
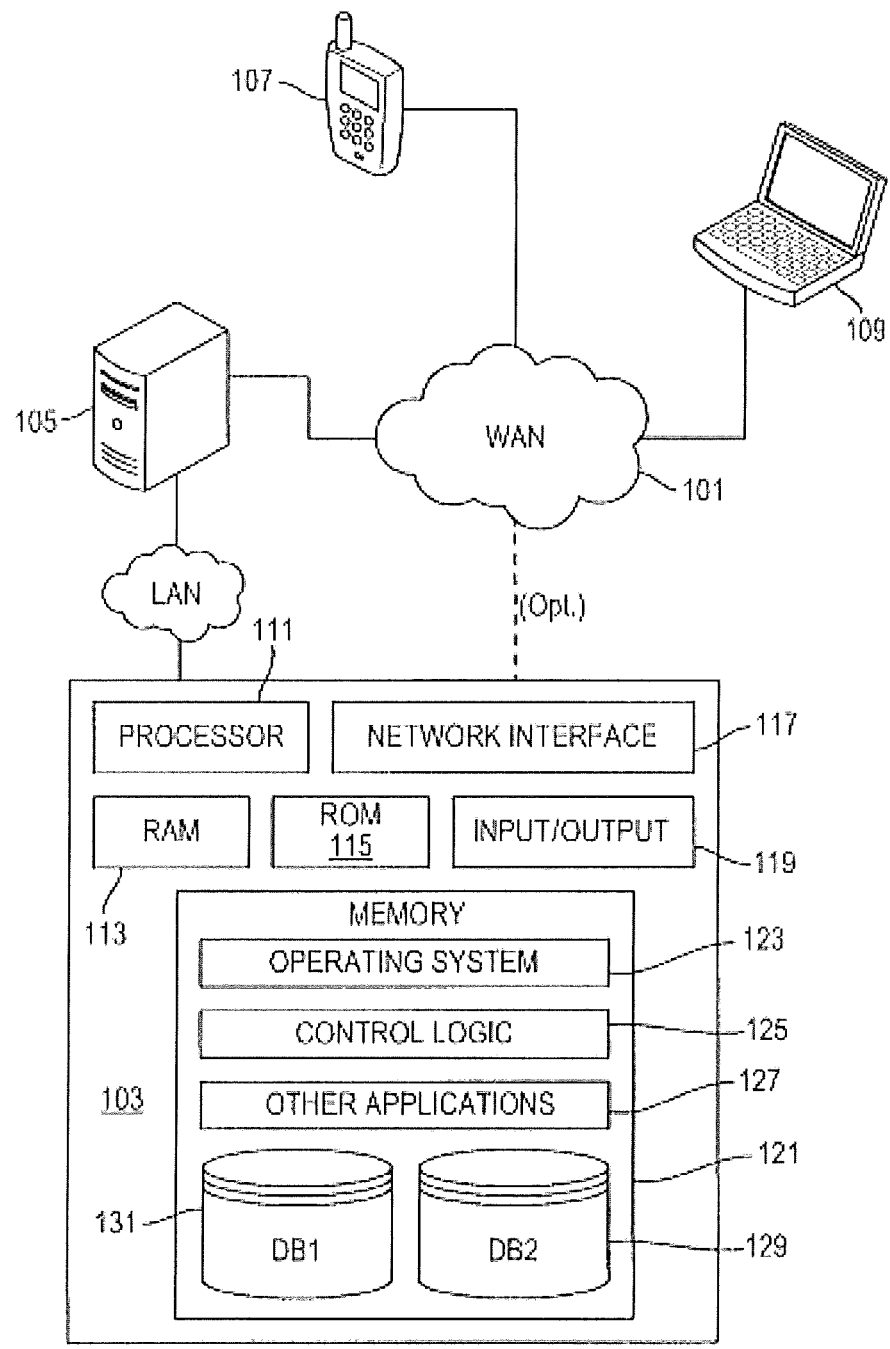
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term □network□ as used herein and depicted in the drawings refers not only to systems in which remote storage devices are coupled together via one or more communication paths, but also to stand-alone devices that may be coupled, from time to time, to such systems that have storage capability. Consequently, the term □network□ includes not only a □physical network□ but also a □content network,□ which is comprised of the data□ attributable to a single entity□ which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
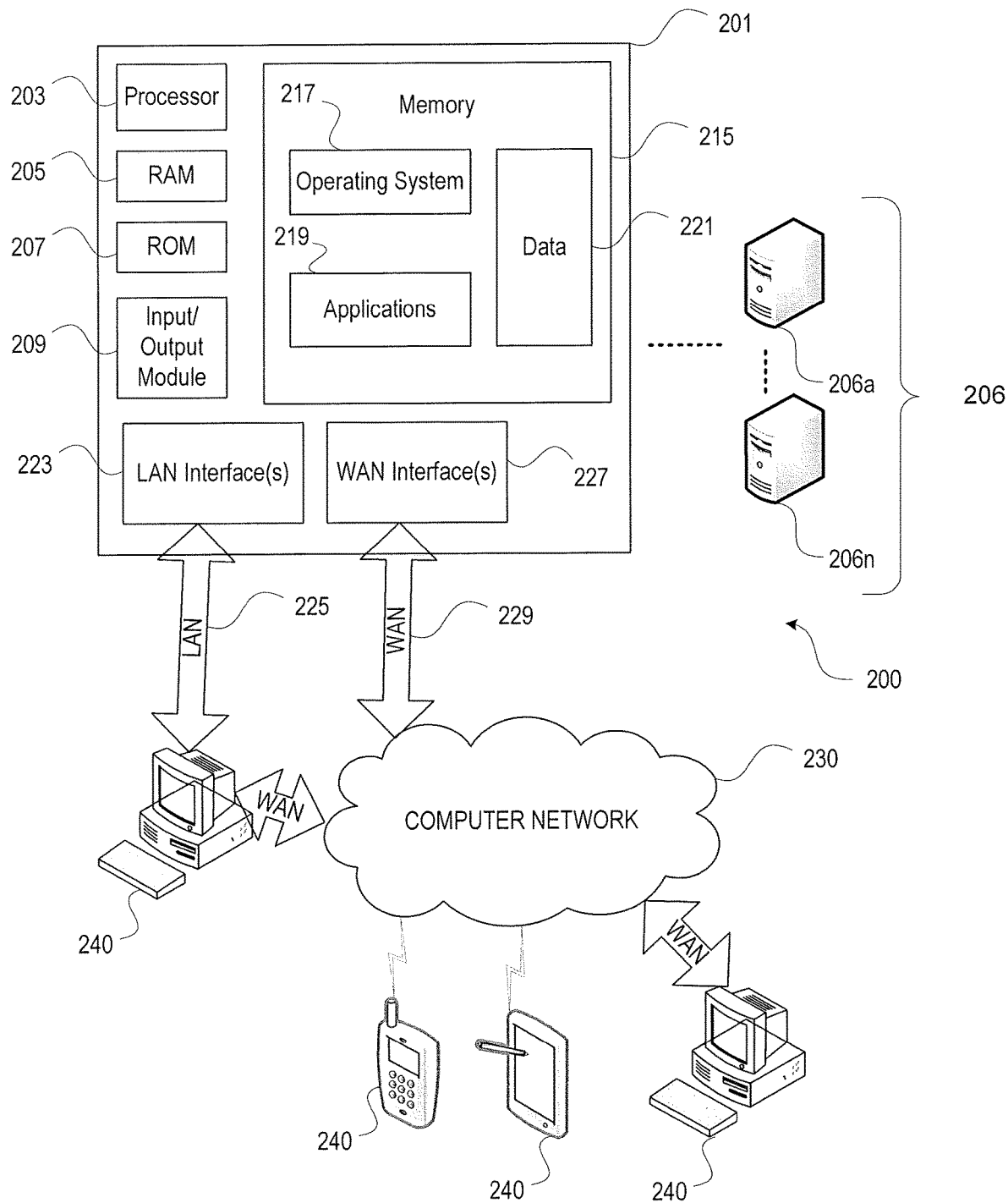
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as □server(s) 206□. In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system (OS) in which local and/or remote applications can be integrated. Applications may include programs that execute after an instance of an OS (and, optionally, also the desktop) has been loaded. Each instance of the OS may be physical (e.g., one OS per device) or virtual (e.g., many instances of an OS running on a single device). Each application may be executed on a local device, or executed on a remotely located device (e.g., remoted).

Figure 3:
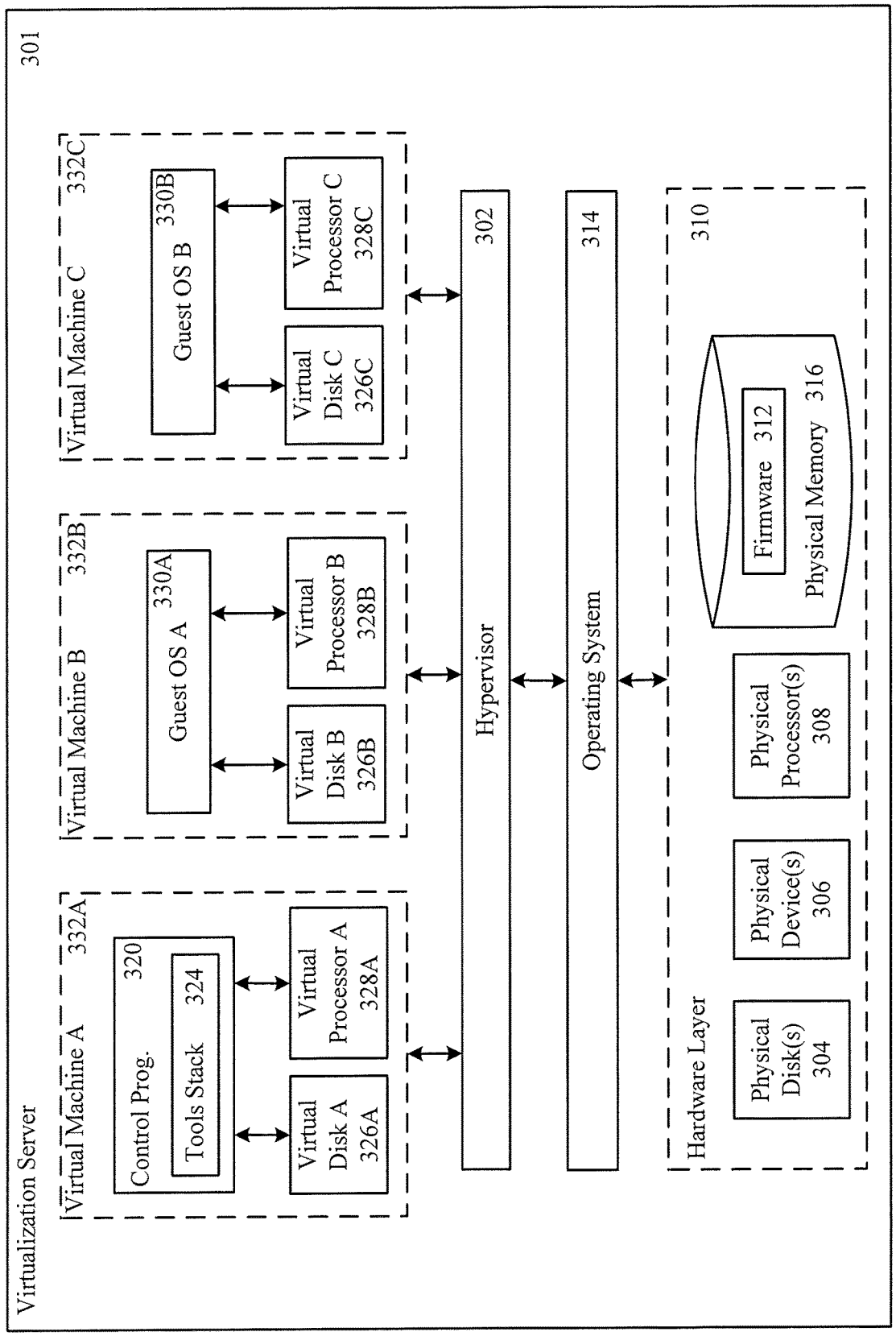
FIG. 3 depicts an illustrative virtualization (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
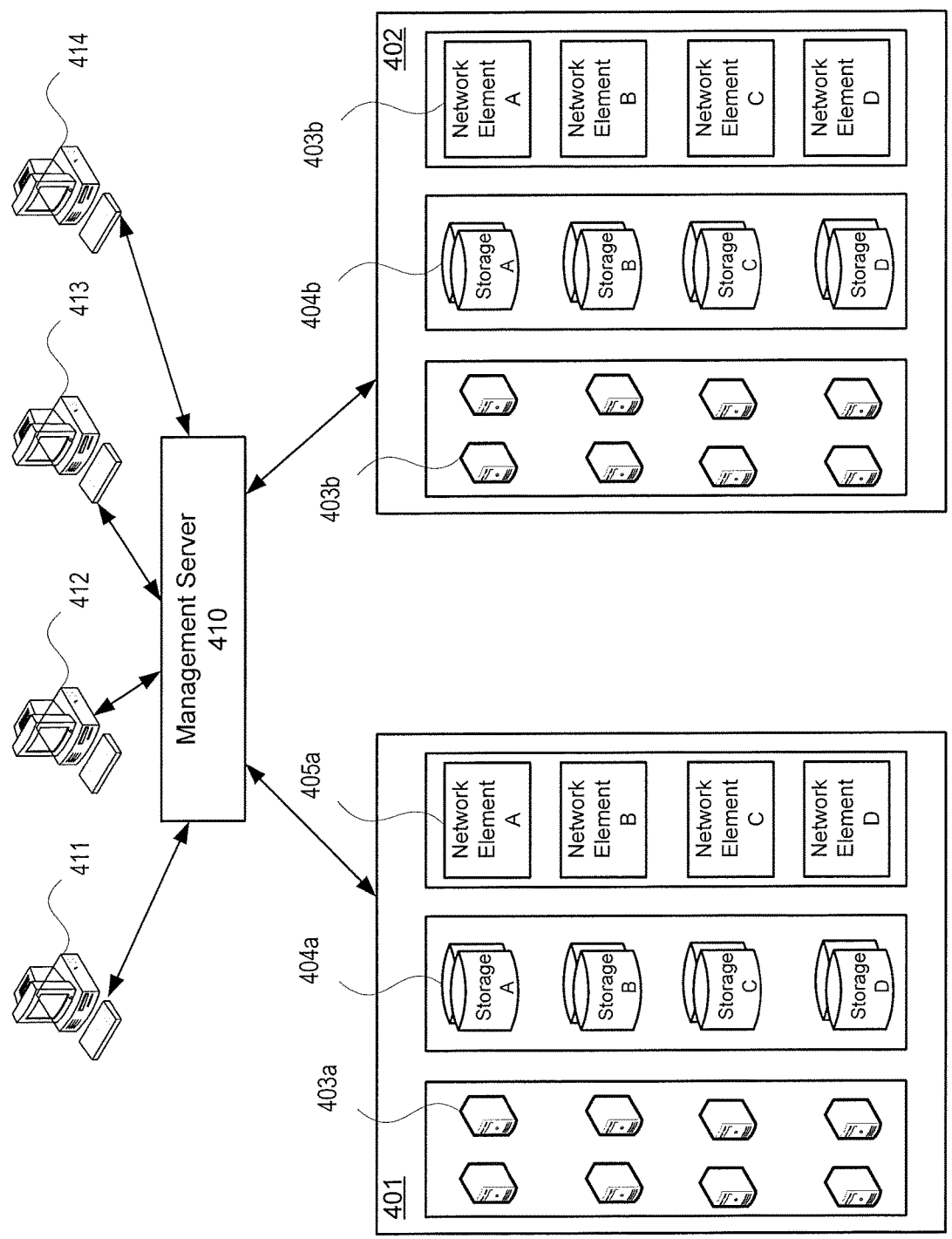
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation), AMAZON EC2 (Amazon.com Inc. of Seattle, Wash.), IBM BLUE CLOUD (IBM Corporation of Armonk, N.Y.), or others.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing an optimal time for updating or upgrading a component of a multi-tenant virtualization system provided at one or more data centers, to have as less a detrimental effect on users accessing the virtualization system as possible. For purposes of the embodiments described below, a tenant may correspond to a company that has purchased a virtualization service, such as XENAPP or XENDESKTOP, whereas an end user or user is an employee of the company that has purchased the virtualization service.

Figure 5:
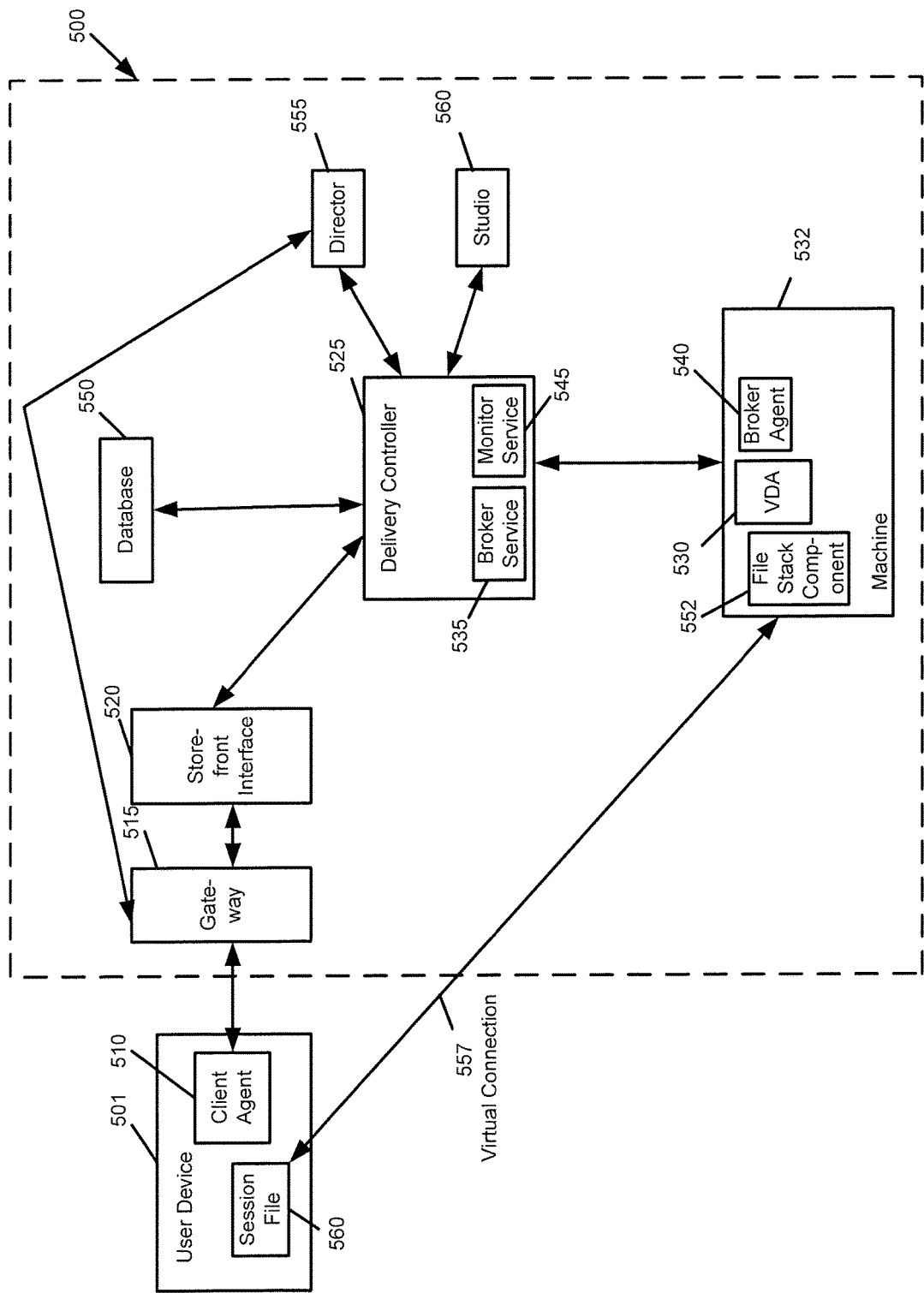
FIG. 5 depicts an illustrative virtualization system architecture that provides virtual sessions to user devices, which may be used in accordance with one or more illustrative aspects described herein.

FIG. 5 is a block diagram of a virtualization system or virtualization environment 500 that may have one or more components upgraded or updated in accordance with one or more embodiments described in detail below. The virtualization system 500 may be accessed, for example, by way of XENAPP or a XENDESKTOP that is provided on a user's computer, desktop, smart phone, or other type of electronic device, to provide anywhere access to various applications to the user. XENAPP and XENDESKTOP allow end users to run applications and desktops independently of the device s operating system and interface. XENAPP and XEN-DESKTOP also allow administrators to manage the network and provide or restrict access from selected devices or from all devices. Further, XENAPP and XENDESKTOP allow administrators to manage an entire network from a single data center or from multiple data centers.

A feature of a virtualization system, such as one accessible via a XENAPP or a XENDESKTOP application, is an ability to integrate provisioning of resources to multiple users who desire virtual access to one or more applications or provisioned desktops on respective devices (e.g., PCs, tablets, smart phones) of the users. To create such a virtualization system, various components may be provided to allow users to connect remotely to applications and desktops, as well as to gather and log data about user activities on the virtualization system.

As shown in FIG. 5, client agent 510 may be installed on user device 501 as an application. In more detail, client agent 510 may be a software application executing on user device 501 that facilitates communications with remote resources and/or virtualized resources, such as communications with virtualization system 500. Client agent 510 supplies the connection to a virtual machine via a network connection, such as via a hypertext transfer protocol (HTTP) network connection using port 80 or a secure hypertext transfer protocol (HTTPS) network connection using port 443. Client agent 510 may correspond to CITRIX RECEIVER by Citrix Systems, Inc. in some embodiments.

Client agent 510 communicates with storefront interface 520 via a network connection (e.g., via a TCP connection on port 80 or port 443). Storefront interface 520 is a component of the virtualization system 500, which may be accessible to user device 501 via a gateway 515 or other type of network access device (e.g., edge server). Gateway 515, which may be implemented as a NETSCALER GATEWAY by Citrix Systems Inc. in some embodiments, may provide administrators of the virtualization system 500 granular application-level and data-level control of virtual sessions, while enabling users with remote access to virtual servers and desktops from any location. Storefront interface 520 performs authentication of users desiring access to the virtualization system 500, and once authenticated, users can then access data by way of user device 501. For example, an authenticated user can access applications stored on the user's work computer at the user's home computer, via the virtualization system 500 shown in FIG. 5.

As shown in FIG. 5, delivery controller 525 communicates with storefront interface 520 via a network connection, to provide data to and from user device 501. Delivery controller 525 corresponds to the central management component of virtualization system 500 that provides services that manage resources, applications, and desktops, and that optimizes and balances the loads of connections to multiple users desiring access to virtualization system 500.

Virtual delivery agent (VDA) 530 is communicatively connected to the delivery controller 525 via a network connection (e.g., an HTTP or an HTTPS connection via the Internet), and may be installed, for example, as an application on machines running WINDOWS SERVER, WINDOWS DESKTOP, or LINUX operating systems, such as machine 532 shown in FIG. 5. VDA 530 allows these machines and the resources they host to be made available to users. The VDA-installed machines running a WINDOWS SERVER OS, a LINUX OS, or any other OS allow the machines to host multiple connections for multiple users, and may be connected, for example, to users on one or more of the following ports:

TCP port 80 or port 443 if Secure Socket Layer (SSL) is enabled

TCP port 2598, if CITRIX GATEWAY PROTOCOL (CGP) is enabled, which enables session reliability TCP port 1494 if CGP is disabled or if the user is connecting with a legacy client Delivery controller 525 sets up a virtual connection between VDA 530 and user device 501, by using a protocol such as CGP, to enable user device 501 to access applications and data stored on the machine that hosts VDA 530. For example, machine 532 that hosts VDA 530 may be a user's work computer located 30 miles the user's home, whereby the user can access applications and files stored on the user's work computer at user device 501 that may be the user's home computer located at the user's home. As a result, user device 501 operates as the user's virtual work computer.

Virtualization system 500 also includes broker service 535, which may be a component of delivery controller 525 in some embodiments, or which may be a separate component communicatively connected to delivery controller 525 in other embodiments. Broker service 535 tracks which users are logged in and where, what session resources the users have, and if users need to reconnect to existing applications. Broker service 535 is communicatively connected with broker agent 540, whereby broker agent 540 is a component provided on the machine 532 that hosts VDA 530. The network connection between broker service 535 and broker agent 540 may be, for example, via TCP port 80 (an unsecured network connection) or TCP port 443 (a secured network connection). In some implementations that utilize a WINDOWS OS, broker service 535 executes POWERSHELL, which is an object-oriented programming language and interactive command line shell for WINDOWS, in order to automate system tasks, such as batch processing, and create systems management tools for commonly implemented processes.

Broker agent 540 has the capability to host multiple plugins and collect real-time data, such as data obtained from a virtual connection between machine 532 and user device 501. Broker agent 540 may be hosted on machine 532 that also hosts VDA 530 (and is communicatively connected to VDA 530), whereby broker agent 540 is communicatively connected to delivery controller 525 via a network connection, for example, via TCP port 80 or TCP port 443.

Monitor service 545 is also provided as a part of virtualization system 500, and may be a component of delivery controller 525 in some embodiments, or may be a separate component communicatively connected to delivery controller 525 in other embodiments. Monitor service 545 collects historical data and stores the historical data in database 550, which may be a SQL database or other type of database that can store data and from which data can be readily retrieved. Monitor service 545 communicates with other components of virtualization system 500 via a network connection, for example, via a network connection using TCP port 80 or TCP port 443.

Also hosted on machine 532 is file/stack component 552, which is an application that collects user information required to connect user device 501 to machine 532 by way of VDA 530.

Database 550 stores data for delivery controller 525, such as site policies, machine catalogs, and delivery groups. Database 550 may be a SQL database or an ORACLE database, or any other type of database from which data can be stored therein and retrieved therefrom.

As discussed briefly above, gateway 515 provides a secure access inside or outside a LAN or WAN firewall, and may be used to authenticate devices attempting to access virtualization system 500 that is provided within the LAN or WAN.

Director 555 is a web-based tool that allows administers access to real-time data from broker agent 540, historical data from database 550, and data from gateway 515, for troubleshooting and support. Director 555 communicates with delivery controller 525 via a network connection, for example, via TCP port 80 or TCP port 443.

Studio 560 operates as a management console that allows administers to configure and manage sites, and gives access to real-time data from broker agent 540. Studio 560 communicates with delivery controller 525 via a network connection, for example, via TCP port 80 or TCP port 443.

Operation of virtualization system 500 will now be explained briefly. Virtualization system 500 is made up of machines with dedicated roles that allow for scalability, high availability, and failover, and provide a solution that is secure by design. Virtualization system 500 may include a plurality of VDA-installed servers, desktop machines, and delivery controller 525, whereby delivery controller 525 manages access to the VDA-installed servers and desktop machines from requests made by user devices, such as a request from user device 501 to access an application or file stored on machine 532.

VDA 530 enables users to connect to desktops and applications. VDA 530 may be installed on server or desktop machines within a data center for most delivery methods to user devices located outside the data center. VDA 530 may also be installed on physical PCs for remote PC access, such as remote PC access to machine 532 from user device 501.

Delivery controller 525 comprises a plurality of independent services that manage resources, applications, and desktops, and optimize and balance user connections. Virtualization system 500 may include one or more delivery controllers based on the number of VDA-installed servers and desktop machines controlled by virtualization system 500. Because sessions are dependent on latency, bandwidth, and network reliability, the one or more delivery controllers ideally may be hosted on the same LAN or on separate LANs.

Users are not provided direct access to delivery controller 525. Rather, VDA 530 serves as an intermediary between users, such as a user of user device 501, and delivery controller 525. When users log on to virtualization system 500 using storefront interface 520, their credentials are passed through to broker service 535, which obtains their profiles and available resources based on the policies set for the users.

To start a virtual session, the user connects to virtualization system 500 via client agent 510, which is installed on user device 501. Within client agent 510, the user selects the physical or virtual desktop or virtual application that is needed. For example, the user selects machine 532. The user's credentials move from client agent 510, gateway 515, storefront interface 520, to delivery controller 525, whereby delivery controller 525 determines what resources are needed by communicating with broker service 535. In some embodiments, storefront interface 520 has access to a security certificate, e.g., a Secure Socket Layer (SSL) certificate, to encrypt the credentials coming from client agent 510.

Broker service 535 determines which desktops and applications the user is allowed to access. Once the credentials are verified, the information about available apps or desktops is sent back to user device 501 through a storefront interface 520-gateway 515-client agent 510 pathway. When the user selects applications or desktops from this list, that information goes back down the storefront interface 520-gateway 515-client agent 510 pathway to delivery controller 525, which determines the proper VDA to host the specific applications or desktop. In the example shown FIG. 5, the proper VDA is VDA 530 hosted on machine 532.

Delivery controller 525 sends a message to VDA 530 (hosted on machine 532) with the user's credentials, and sends the data about the user and the connection to VDA 530. The VDA 530 accepts the connection and sends the information back through the same pathways all the way to client agent 510 on user device 501. Client agent 510 bundles the information that has been generated in the session to create a session file 560 on user device 501.

Session file 560 is used by user device 501 to establish a direct connection, shown as virtual connection 557 in FIG. 5, between user device 501 and file/stack component 552 running on VDA 530 on machine 532. This connection bypasses client agent 510, gateway 515, storefront interface 520, and delivery controller 525.

The direct connection 557 between user device 501 and the VDA may use a specific protocol, such as the Citrix Gateway Protocol (CGP). If the direct connection 557 is lost, the user need only reconnect to VDA 530 rather than having to relaunch through a management infrastructure that includes client agent 510, storefront interface 520, and delivery controller 525. Once user device 501 connects to VDA 530, VDA 530 notifies delivery controller 525 that the user is logged on, and delivery controller 525 sends this information to database 550 and starts logging data using monitor service 545.

Within delivery controller 525, broker service 535 reports session data for every session on the virtual machine providing real-time data. Monitor service 545 tracks the real-time data and stores it as historical data in database 550.

Studio 560 communicates with broker service 535 and is used to deploy a virtualization environment, whereby studio 560 has access to real-time data. Director 555 communicates with broker service 535 to access database 550, and is used to support users of the virtualization system 500. Director 550 may provide a dashboard to an administrator, which shows the number of sessions, if there are any failed sessions, session durations, applications running on each session, etc. Additionally, director 555 may also access gateway 515 to obtain information on data passing between client agent 510 and storefront interface 520.

From time to time, updates and upgrades to virtualization system 500 need to be performed, whereby if a user has not established a session with virtualization system 500 to access a virtual server or desktop, that user will not be allowed to establish a session until the update is complete. Upgrading the virtualization system 500 requires a quiescent database (e.g., database 550 shown in FIG. 5), whereby the database may not be accessed while the upgrade is being performed. When a virtualization service is provided as a cloud service, such as a service accessible via the Internet, regular upgrades would result in regular downtimes corresponding to times when the regular upgrades are performed. This of course is an undesirable feature, and thus there is a desire to perform updates and upgrades to virtualization system 500 with as little impact as practicable on users seeking access to virtualization system 500.

In some embodiments, updates/upgrades are performed on a per-tenant basis, whereby users associated with a tenant (e.g., employees of a company that has purchased a virtualization system, in which the employees are the end users and the company is the tenant) have the virtualization system that they access upgraded/updated at the same time. Session launch data of the end users of the tenant are used as a criteria to determine when the tenant has the fewest users accessing the virtualization system, to thereby minimize service disruption to the end users of the tenant to the greatest extent possible. For multi-tenant virtualization systems in which more than one tenant (e.g., Company A and Company B) access the same virtualization system, the optimal update/upgrade time for the virtualization system may be based on the combined session launches of the respective end users of the plurality of tenants.

Figure 6:
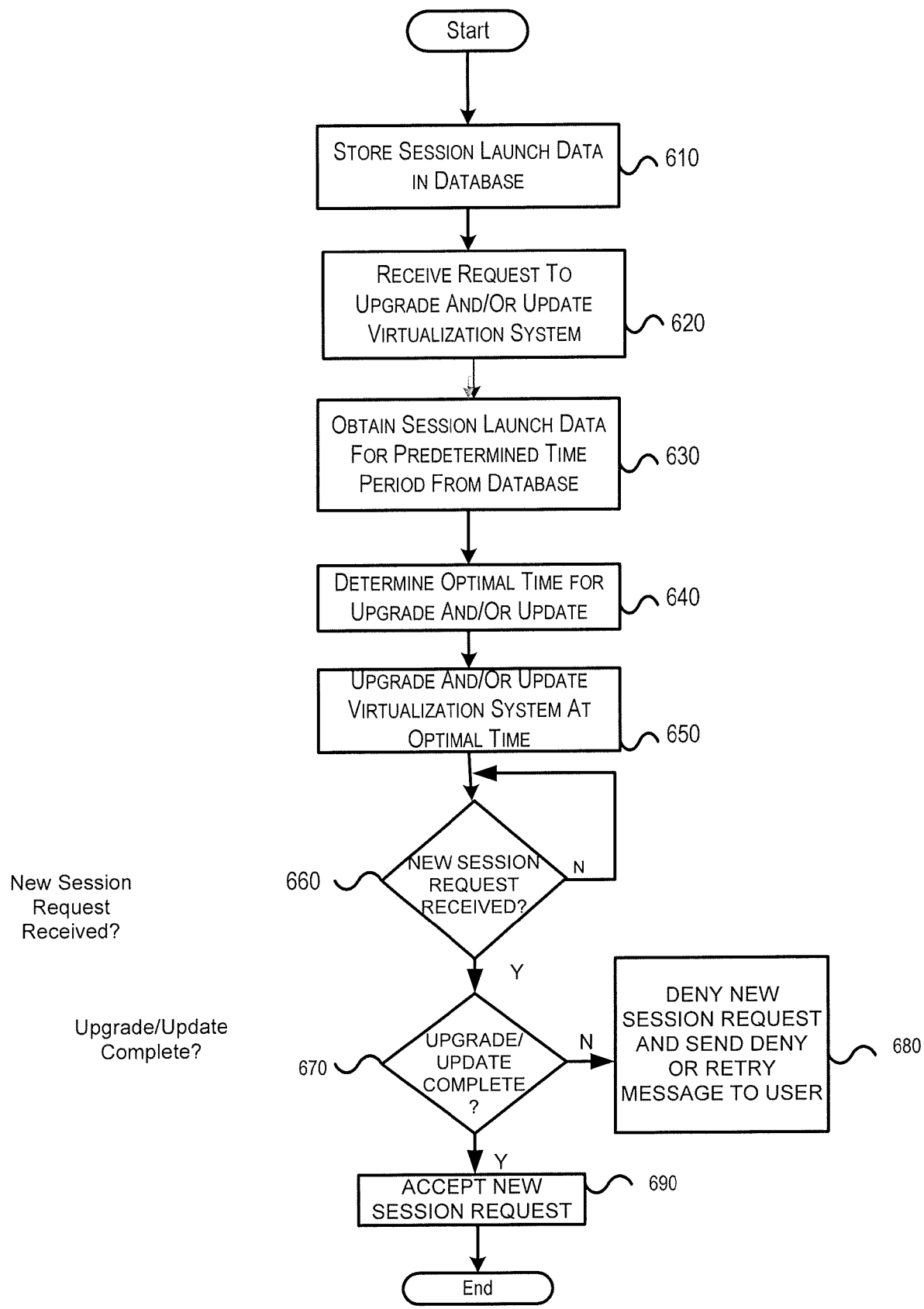
FIG. 6 depicts a flowchart that illustrates a method of upgrading and/or updating a virtualization system based on session launch data reception times, according to one or more illustrative aspects described herein.

FIG. 6 depicts a flowchart that illustrates a method of performing updates and/or upgrades to a multi-tenant virtualization system using session launch data as a factor in determining when to perform the updates and/or upgrades for each tenant, according to one or more embodiments. By using session launch data to determine when to perform updates and/or upgrades, downtime windows can be tailored to each tenant of a virtualization system, whereby there is no need to contact users to request a desired downtime window. Also, by using session launch data as a factor in determining when to perform the updates and/or upgrades, a more optimal update/upgrade time is utilized, as compared to determining an update and/or upgrade time based on the time zone of the headquarters of a company (i.e., the tenant) that a user works for, since the user may be anyway in the World when the user attempts to access the virtualization system and many time zones apart from the headquarters time zone.

With reference also to FIG. 5, in step 610 of FIG. 6, session launch data from a plurality of users seeking access to virtualization system 500 is stored in database 550. Session launch data may be obtained, for example, by monitor service 545, which then stores the obtained session launch data in database 550. For example, when a user of user device 501 launches XENDESKTOP to attempt to create a virtual session to access an application or files on machine 532, that launch event is passed from client agent 510 to storefront interface 520 via gateway 515, and then to delivery controller 525, whereby monitor service 545 detects the time when the session launch data was initially made by a user of user device 501 (which typically is very close in time to when the session launch data arrived at delivery controller 525, such 1 to 2 seconds ago or less). Each session launch time from users seeking access to virtualization system 500 is detected by monitor service 545, and stored as a separate entry in database 550. For example, if a session launch was made by a user of user device 501 at 8:05 a.m. on Apr. 7, 2017, then the following data may be stored by monitor service 545 in database 550: Session Launch Request by User #58 at 8:05 a.m. on Apr. 7, 2017.

In step 620, a request to upgrade and/or update virtualization system 500 is received. This may be, for example, a request by a third-party provider that has provided a software patch to a component of virtualization system 500.

Based on the received update/upgrade request, in step 630, the session launch data stored in database 550 is obtained for a predetermined time period, such as obtaining all session launch data from all users seeking access to virtualization service 500 over the past three months.

Figure 7:
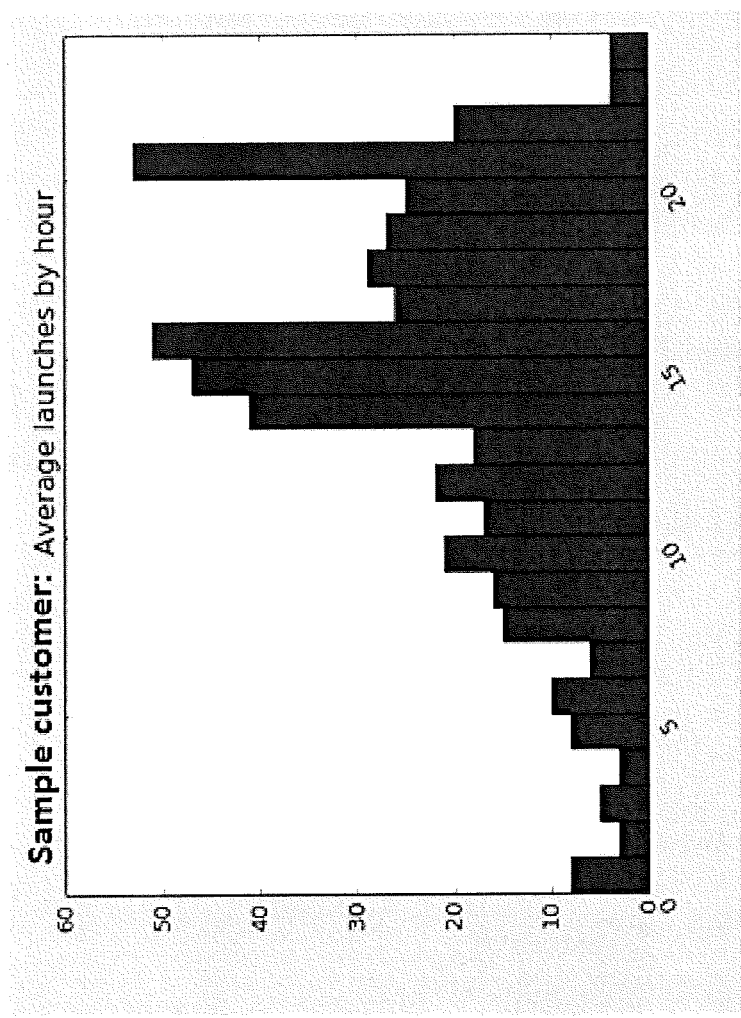
FIGS. 7-9 are charts that illustrate session launch data times made by one or more users with respect to a virtualization system, whereby such information may be used to perform updates and/or upgrades of the virtualization system in accordance with one or more illustrative aspects described herein

In step 640, an optimal update and/or upgrade time is determined based on the session launch data received during the predetermined time period. Turning now to FIG. 7, which shows an example of session launch data made by a single user to a virtualization system, such as session launch data made by a user of user device 501 to virtualization system 500 in FIG. 5, a chart of session launch data made over a particular period of time, such as over the past three months, is obtained. FIG. 7 shows the session launch data displayed as a bar chart, which shows the number of session launches made during each hour of a 24-hour day. Based on the session launch data shown in FIG. 7, which indicates the session launch times for a single user to a virtualization system over a particular time period such as the last three months, an optimal update/upgrade time for the virtualization system may be determined to be at a time anywhere between the $23^{rd}$ hour of the day (e.g., 11 p.m.) and the $4^{th}$ hour of the day (e.g., 4 a.m.). Depending on the amount of time that the update/upgrade is expected to take, the upgrade/update time may be chosen such that the upgrade/update is started and completed during a time when it is unlikely that the user will be accessing the virtualization system. For example, the upgrade/update time based on the session launch data shown in FIG. 7 may be chosen to start at 11:15 a.m., whereby the upgrade/update time may be expected to take 5 minutes to complete.

In step 650, based on the optimal upgrade/update time computed in step 640, one or more components of the virtualization system of FIG. 5 are upgraded/updated. For example, VDA 530 and broker service 535 may be updated starting at 11:15 a.m. in the example described above.

In step 660, a determination is made as to whether a new session request has been received. If No, then the process proceeds as normal (i.e., the upgrade/update continues, and the virtualization system continues to listen for new session requests). Is Yes, then in step 670 a determination is made as to whether the upgrade/update has completed. If the upgrade/update has not completed ('No' determination result from step 670), then the new session request is denied in step 680. If the upgrade/update has completed ('Yes' determination result from step 670), then the new session request is accepted in step 690. In an alternative embodiment, instead of denying the new session request from the user, the user is sent a 'retry' return message, making it appear to the client that the virtualization system 500 is performing slowly, but not failing due to an update/upgrade currently being performed. In essence, the user thinks that his/her request is being retried by the virtualization system 500 and thus the user does not have to resubmit his/her request, whereby the virtualization system 500 maintains the original request from the user in a queue and acts on the request as soon as the update/upgrade has completed.

During the upgrade/update time, existing sessions are maintained and are not negatively affected by the upgrading/updating of the virtualization system 500. This is the case since, as seen in FIG. 5, once a virtual session between user device 501 and machine 532 has been set up and is operational, a direct connection 557 between user device 501 and machine 532 is set up and fully operational, and any updates to the virtualization system 500 that helped set up the direct connection 557 does not affect the connectivity between user device 501 and machine 532.

Figure 8:
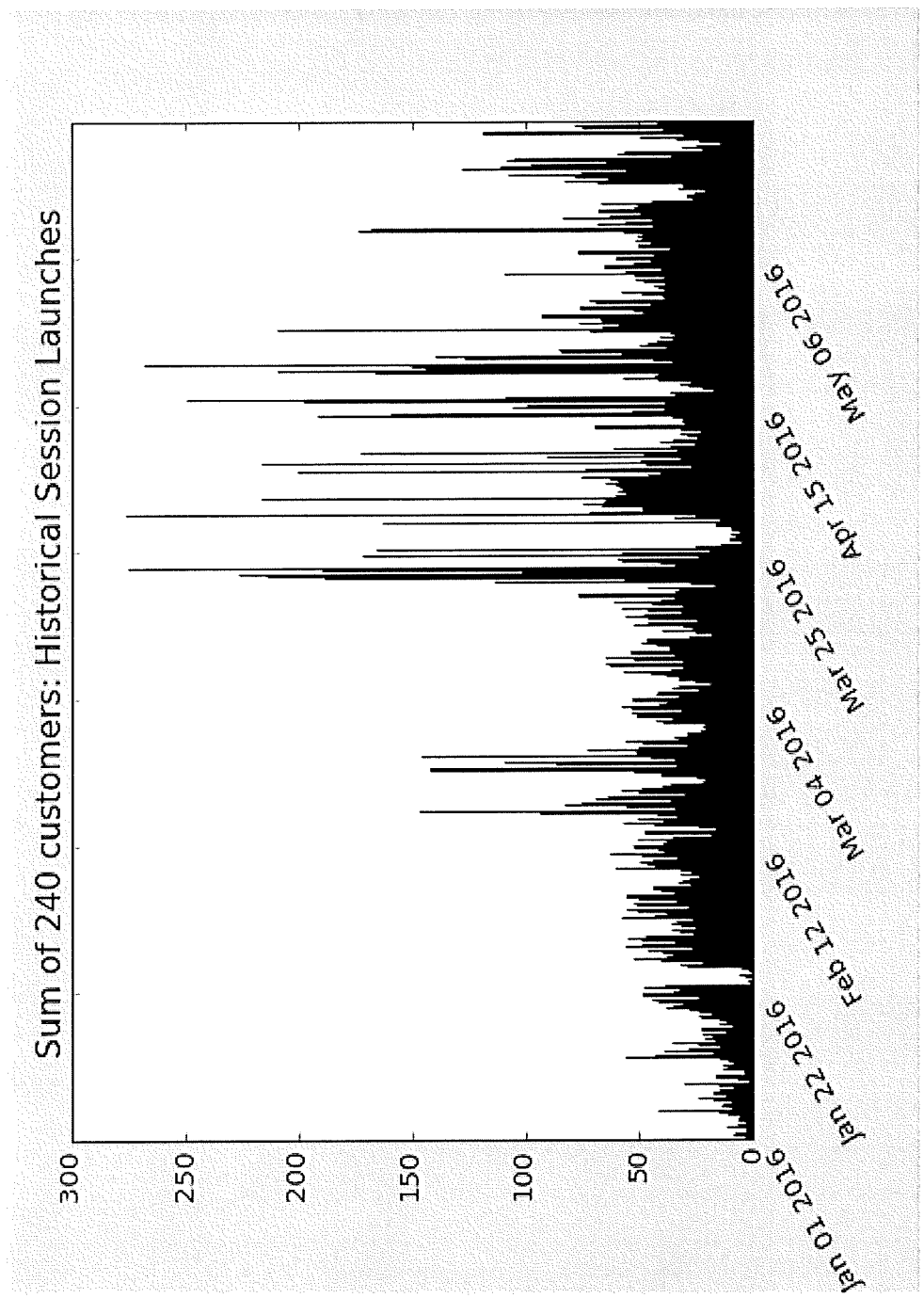
Figure 9:
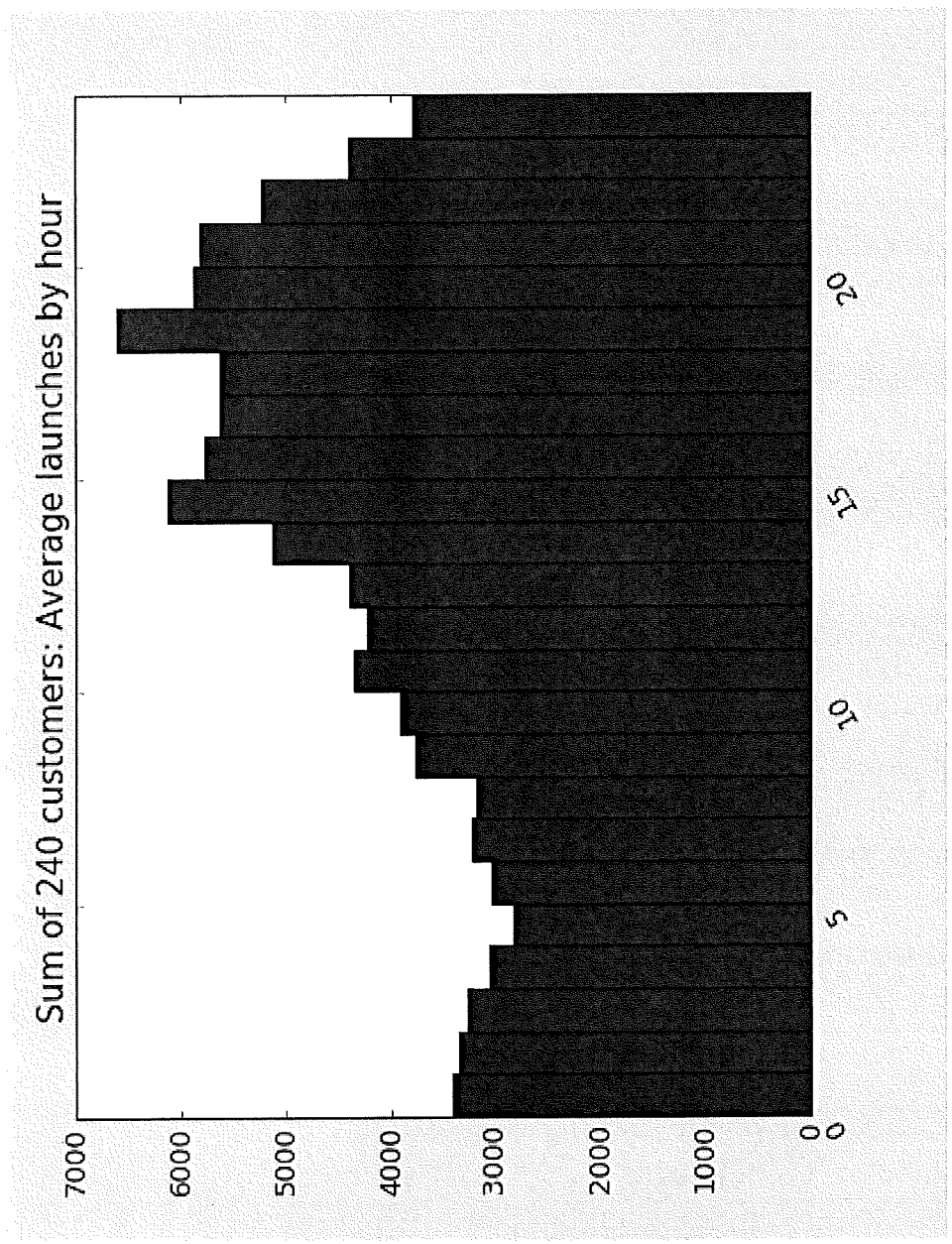

FIGS. 8 and 9 show an example of session launch data made to a multi-tenant virtualization system, such as session launch data made by a user of user device 501, as well as other users with their associated user devices (not shown in FIG. 5), to virtualization system 500 in FIG. 5. In particular, FIG. 8 shows a chart of session launch data made over a particular period of time, such as over the past three months, as broken down by the particular day during a six month period that each session request was made. FIG. 9 shows the session launch data displayed as a bar chart, which shows the number of session launches made during each hour of a 24-hour day. Based on the session launch data shown in FIGS. 8 and 9, which indicates the session launch times to a virtualization system over a particular time period, an optimal update/upgrade time-of-day and day-of-month for the virtualization system may be determined. For example, several days between Jan. 22, 2016 and Feb. 12, 2016 indicate very few session launches being made, and several days between Mar. 25, 2016 and Apr. 15, 2016 indicate very few session launches being made. Thus, for updates/upgrades to be made in years after 2016, those days in years 2017, 2018, etc. may be chosen to lessen any impact on users seeking access to the virtualization system.

Also, based on the time-of-day session launch data shown in FIG. 9, the optimal time-of-day to perform an update/upgrade for a multi-tenant virtualization system may be at 5 a.m. Accordingly, based on the session launch data of end users as shown in FIGS. 8 and 9, both an optimal day of the year, as well as an optimal time of day, may be determined to perform an update/upgrade of one or more components of a virtualization system, to have as less an impact as possible on users seeking access to the virtualization system.

Based on the optimal day-of-year and the optimal time-of-day to perform an update/upgrade, such updates/upgrades may be scheduled automatically. For example, based on session launch data obtained by monitor service 545, monitor service 545 may determine the hours of the day and days of the year that have the least amount of session launches made. Based on that information, and based on the estimated time for an update/upgrade (e.g., 30 minutes, 1 hour, etc.), monitor service 545 may automatically select a day and a time during that day to perform an update/upgrade. Based on the importance of an update/upgrade, e.g., non-critical upgrade, moderately critical upgrade, or very critical upgrade, monitor service 545 may choose the best day over the next few days to perform the update/upgrade if the update/upgrade is non-critical (e.g., if today is March 18, select March 27 at 5 a.m. to perform an update/upgrade based on the data shown in FIGS. 8 and 9), and monitor service 545 may choose the best hour of the current day to perform the update/upgrade if the update/upgrade is critical (e.g., if today is March 18, select 5 a.m. on March 18 based on the data shown in FIG. 9). For example, based on the criticality of the update/upgrade to performed, and based on a table that stores time frames by which such an update/upgrade should be performed at the latest, the optimal update/upgrade time may be determined. As an example, a table may store the values of: 1 hour for a highly critical update/upgrade, 24 hours for a moderately critical update/upgrade, and 7 days (168 hours) for a non-critical update/upgrade, whereby, based on this information, and based on the session launch data for a particular past time period such as shown in FIGS. 7-9, an optimal time to perform the update/upgrade may be determined. Given that most updates/upgrades take 5 minutes or less, when those updates/upgrades are performed during an hour of the day when users are least likely to launch session requests, the impact on users seeking access to the virtualization system is minimized.

In other embodiments, instead of monitor service 545 automatically performing updates/upgrades based on session launch data stored in database 550, the information obtained by monitor service 545 is provided to an administrator, such as in the manner shown by way of the plots of FIGS. 7, 8 and 9, and the administrator selects the appropriate day and time of day to have the update/upgrade done on one or more components of the virtualization system.

Figure 10:
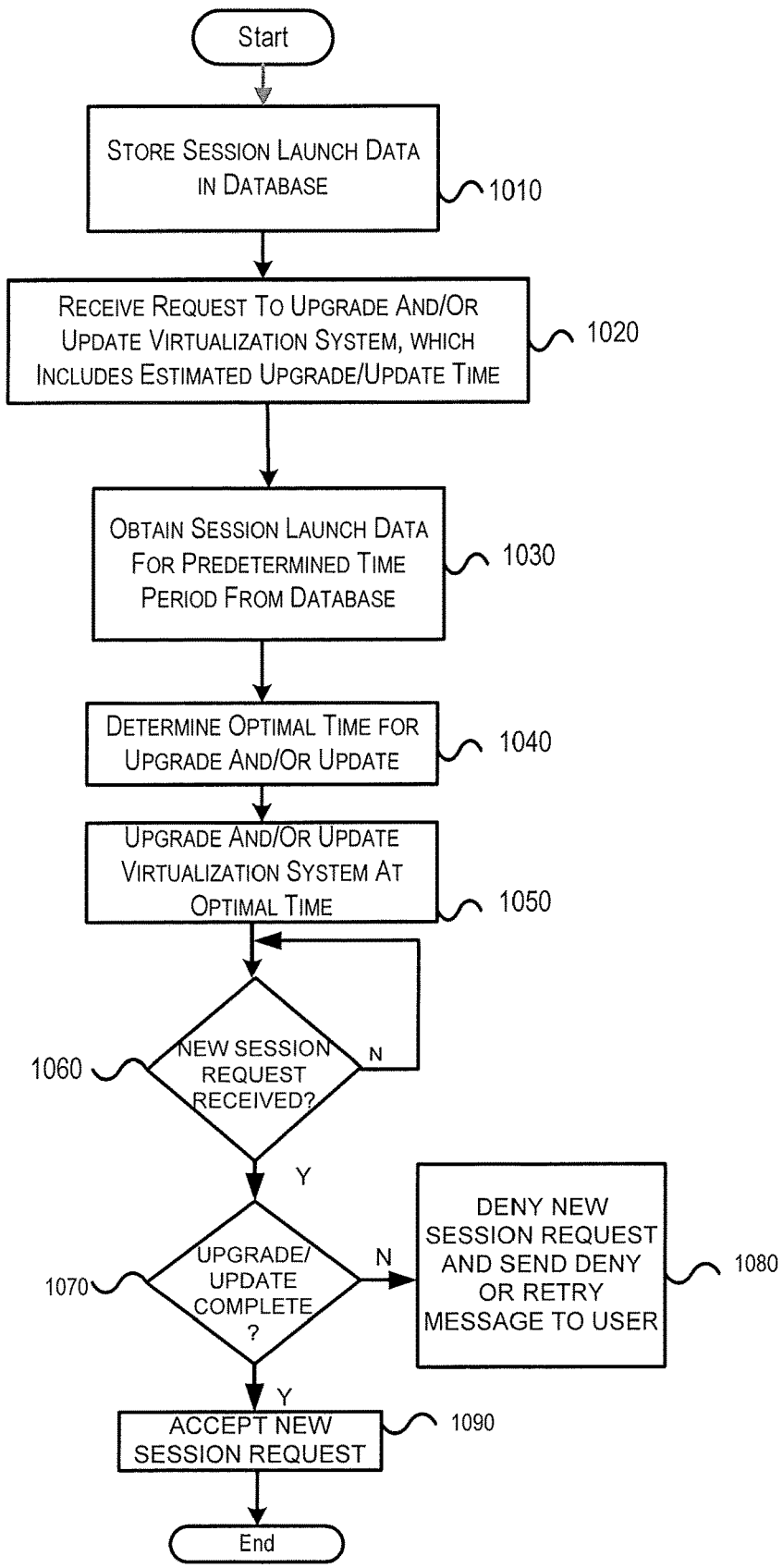
FIG. 10 depicts a flowchart that illustrates a method of upgrading and/or updating a virtualization system based on session launch data reception times and estimated update/upgrade times, according to one or more illustrative aspects described herein.

FIG. 10 depicts a flowchart that illustrates a method of performing updates and/or upgrades to a multi-tenant virtualization system using session launch data and estimated update/upgrade time as factors in determining when to perform the updates and/or upgrades, according to one or more embodiments.

With reference also to FIG. 5, in step 1010 of FIG. 10, session launch data from a plurality of users seeking access to virtualization system 500 is stored in database 550. Session launch data may be obtained, for example, by monitor service 545, which then stores the obtained session launch data in database 550.

In step 1020, a request to upgrade and/or update virtualization system 500 is received, whereby such a request includes an estimated upgrade/update time. This may be, for example, a request by a third-party provider that has provided a software patch to a component of virtualization system 500, and whereby the third-party provider provides information as to the estimated upgrade/update time, e.g., 5 minutes.

Based on the received update/upgrade request, in step 1030, the session launch data stored in database 550 is obtained for a predetermined time period, such as obtaining all session launch data from all users seeking access to virtualization service 500 over the past three months.

In step 1040, an optimal update and/or upgrade time is determined based on the session launch data received during the predetermined time period, and based on the estimated update/upgrade time. If the estimated update/upgrade time is less than one hour, which is normally the case, then the determined update/upgrade time is the same as would be computed in the embodiment shown in FIG. 6, whereby if the estimated update/upgrade time is more than one hour, which is not normally the case, then the determined update/upgrade time may be different. For example, referring to FIG. 7, if the estimated update/upgrade time is 5 minutes, then the specific hour during the day that has the least number of session launches is obtained as the optimal update/upgrade time period.

In step 1050, based on the optimal upgrade/update time computed in step 1040, one or more components of the virtualization system of FIG. 5 are upgraded/updated. For example, VDA 530 and broker service 535 may be updated starting at 11 p.m. for a 5 minute upgrade in the example described above.

In step 1060, a determination is made as to whether a new session request has been received. If No, then the process proceeds as normal (i.e., the upgrade/update continues, and the virtualization system continues to listen for new session requests). Is Yes, then in step 1070 a determination is made as to whether the upgrade/update has completed. If the upgrade/update has not completed ('No' determination result from step 1070), then the new session request is denied in step 1080. In an alternative embodiment, instead of denying the new session request from the user, the user is sent a 'retry' return message, making it appear to the client that the virtualization system 500 is performing slowly, but not failing due to an update/upgrade currently being performed. Similar to the embodiment described with reference to FIG. 6, in essence, the user thinks that his/her request is being retried by the virtualization system 500 and thus the user does not have to resubmit his/her request, whereby the virtualization system 500 maintains the original request from the user in a queue and acts on the request as soon as the update/upgrade has completed.

If the upgrade/update has completed ('Yes' determination result from step 1070), then the new session request is accepted in step 1090.

Similar to the discussion with respect to the embodiment of FIG. 6, during the upgrade/update time, existing sessions are maintained and are not negatively affected by the upgrading/updating of the virtualization system 500.

Figure 11:
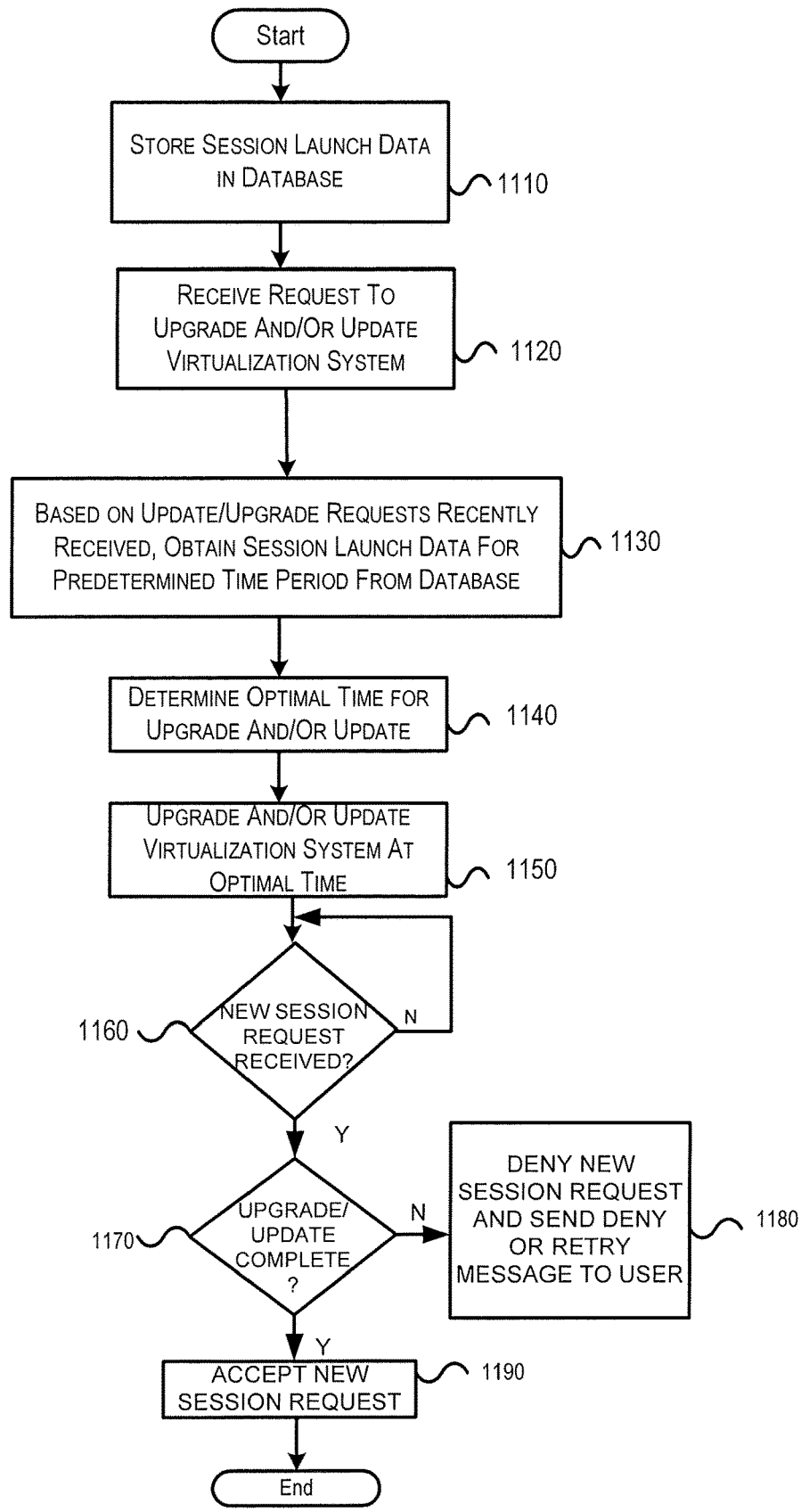
FIG. 11 depicts a flowchart that illustrates a method of upgrading and/or updating a virtualization system based on session launch data reception times and the number of update/upgrade requests recently received by the virtualization system, according to one or more illustrative aspects described herein.

FIG. 11 depicts a flowchart that illustrates a method of performing an update/upgrade to a multi-tenant virtualization system using session launch data and information regarding other updates/upgrades that also need to be performed, in determining when to perform the updates and/or upgrades, according to one or more embodiments.

With reference also to FIG. 5, in step 1110 of FIG. 10, session launch data from a plurality of users seeking access to virtualization system 500 is stored in database 550.

In step 1120, a request to upgrade and/or update virtualization system 500 is received.

Based on the received update/upgrade request and based on other update/upgrade request received in the recent past, such as ones received in the last three days, in step 1130, the session launch data stored in database 550 is obtained for a predetermined time period.

In step 1140, an optimal update and/or upgrade time is determined based on the session launch data received during the predetermined time period, and based the number of other updates/upgrades that need to be performed on the virtualization system, as well as information regarding the criticality of each of the updates/upgrades to be performed. For example, if a highly critical update/upgrade needs to be performed quickly and cannot wait, then any other update/upgrade requests, such as moderately critical and non-critical update/upgrade requests, may also be performed at the same time as the highly critical update/upgrade. Referring to FIG. 7, if a highly critical update/upgrade request is received at 2 p.m., and if a non-critical request is received at 2:30 p.m., then both update/upgrades may be performed at a less-than-optimum-from-a-launch-data perspective of 5 p.m., since the criticality of one of the update/upgrades weighs against waiting until a more launch-data-optimal time of 11 p.m. to perform the updates/upgrades. In other words, instead of performing the highly critical update/upgrade at 5 p.m. and then performing the non-critical update/upgrade at 11 p.m. on a particular day in which both requests were received earlier in the day, both update/upgrades are performed, in parallel, at 5 p.m., assuming that this is acceptable for proper updating/upgrading of components in each of the two update/upgrades. Alternatively, if the highly critical and the non-critical update/upgrade are with respect to one component that can only be updated/upgraded by update/upgrade patches one at a time, based on the estimated time required for each update/upgrade, then both update/upgrades may be performed one after another, say from 5 □5:15 p.m. for the highly critical update and from 5:15 p.m. to 5:30 p.m. for the non-critical upgrade, while providing an update/updating that utilizes session launch data to determine an optimal update/upgrade time to have as less an impact on users seeking access to a virtualization system as possible.

In step 1150, based on the optimal upgrade/update time computed in step 1140, one or more components of the virtualization system of FIG. 5 are upgraded/updated.

In step 1160, a determination is made as to whether a new session request has been received. If No, then the process proceeds as normal (i.e., the upgrade/update continues, and the virtualization system continues to listen for new session requests). Is Yes, then in step 1170 a determination is made as to whether the upgrade/update has completed. If the upgrade/update has not completed ('No' determination result from step 1170), then the new session request is denied in step 1180. In an alternative embodiment, instead of denying the new session request from the user, the user is sent a 'retry' return message, making it appear to the client that the virtualization system 500 is performing slowly, but not failing due to an update/upgrade currently being performed. Similar to the embodiment described with reference to FIG. 6, in essence, the user thinks that his/her request is being retried by the virtualization system 500 and thus the user does not have to resubmit his/her request, whereby the virtualization system 500 maintains the original request from the user in a queue and acts on the request as soon as the update/upgrade has completed.

If the upgrade/update has completed (Yes' determination result from step 1070), then the new session request is accepted in step 1190.

Similar to the discussion with respect to the embodiments of FIG. 6 and FIG. 10, during the upgrade/update time, existing sessions are maintained and are not negatively affected by the upgrading/updating of the virtualization system 500.

In some embodiments, additional information beyond estimated update/upgrade time and number of updates/upgrades to be performed and their criticality may be utilized along with session launch data, to determine an optimal update/upgrade time to have as less an impact on users seeking access to a virtualization system as possible. For example, information regarding availability of Information Technology (IT) personnel and support personnel may be utilized to determine an optimal update/upgrade time, since if no IT personnel are available during a time in which an update/upgrade is to be performed, this may lead to a major issue in that if a problem occurs during the update/upgrade in which it gets hung up in an infinite loop, no one is available to attempt to fix the problem, such as by aborting the failed update/upgrade and restoring the virtualization system back to a pre-update/upgrade environment. The additional information may also include user canary groups and the time since the last update/upgrade was performed. Canary groups are groups of users who accept using prototype systems (e.g., □beta□version of an application) that are not provided to all users, whereby the canary groups act as testers of the prototype systems in order to fix as many bugs as possible prior to providing the system to all users. Such canary groups may be provided with incentives, such as a lesser fee to access a beta version of the virtualization system, at the expense of having to deal with possible problems associated with non-fully-tested software associated with the beta version.

By way of example, for a virtualization system having an IT staff of five persons, the following schedule for the IT staff is stored in database 550: Monday, two persons available; Tuesday ☐Friday, three persons available; Saturday, one person available; Sunday, no persons available. Based on predetermined information (which can be stored in database 550, or in another memory accessible by delivery controller 525) regarding how many IT persons are generally required to handle a particular update/upgrade, as well as session launch data information such as shown in FIGS. 7-9, an optimal update/upgrade time may be determined. By way of example, based on past history regarding update/upgrades performed, a highly critical update request typically requires at least three IT personnel to be available during the update/upgrade, a moderately critical update request typically requires at least two IT personnel to be available during the update/upgrade, and a non-critical update/upgrade typically requires at least one IT personnel to be available during the update/upgrade. Continuing with the example, if a highly critical update request is received on a Saturday, then, based on the information regarding IT personnel availability, the earliest that the highly critical update request can be performed is on the following Tuesday when three IT personnel are available for the update. For that Tuesday, then an appropriate time during the day can be chosen for the update, based on the number of session launches per each hour of the day, such as based on the chart as shown in FIG. 9. In some embodiments, based on the severity of the need for the update, such as a patch needed for a serious computer virus that is rapidly spreading throughout the Internet, an administrator may decide to have the highly critical update performed sooner, such as on Monday with two IT personnel available to handle any possible issues that may come up during the update.

In some embodiments, end user activity may be leveraged as an indicator of customer use of a virtualization system, to use in performing tasks other than optimal update/upgrade times. For example, end user activity may indicate that some users rarely use the virtualization system, whereby such users would likely drop out as a customer in the future. By determining which customers have less than a certain number of session launches made over a past time period, such as customers making less than four launches over the past month to a virtualization system, such customers may be reached out to determine why they are not using the virtualization system very much, and to offer them incentives to do so in the future (e.g., at a discounted rate of half-price for the next month). This may bring back one or more customers who would have dropped out as a customer, as full customers of the virtualization system.

In some embodiments, session launch data, as well as the geographical location where each session launch was made, may be obtained and analyzed, to determine an appropriate location for a virtualization system that includes multiple virtualization servers and desktops. For example, if session launch data geographical data indicates that session launches to a virtualization system located in Springfield, Ill. are mostly from users located in Michigan, then it may be better to move the virtualization system to a location closer to the users, such as to Detroit, Mich. This may provide for a faster and less-problematic access by users via network connections to the virtualization system. Also, a virtualization system located in a particular geographic area may be configured with applications suited for users accessing that virtualization system, whereby a first set of applications may be stored on virtual servers and desktops accessible by one user group, and whereby a second set of applications may be stored on virtual servers and desktops accessible by a different user group.

In some embodiments, session launch data, as well as application usage data indicating which applications are being used most often by users accessing a virtualization system, may be obtained and analyzed. With such information, such as information indicating that most users access Microsoft WORD applications and Microsoft VISIO applications as opposed to Microsoft EXCEL applications, may provide users with information that may be useful to them, such as by users deciding to purchase WORD and VISIO applications for installation on their home computers, or which applications for which future research and development are to be focused (e.g., the applications that are most popular and most accessed by users on a virtualization system).

As illustrated above, various aspects of the disclosure relate to computer hardware and software for determining optimal update and/or upgrade times for a virtualization system. As described above, in a multi-tenant virtualization system that includes a first tenant comprising a plurality of first end users and a second tenant comprising a plurality of second end users, the determined update times for updating the virtualization system may be the same for each tenant accessing the multi-tenant virtualization system, based on the session launch data of the respective end users of the first and second tenants. For a virtualization system that includes a first component that is utilized by both the first and second tenants, and that includes a second component that is utilized by only the second tenant, the optimal update/upgrade time for each component may be different, since the first component may be updated based on session launch data of end users of both the first and second tenants, whereas the second component may be updated based on session launch data of end users of only the second tenant. While the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method for updating a virtualization system provided for a plurality of tenants, in which each tenant comprises at least one end user, comprising:
   querying, from a database, session launch data for the at least one end user of each of the plurality of tenants;
   analyzing the session launch data for session launch activity;
   determining an update time for a component of the virtualization system based on the analysis and based on an estimated length of time needed to update the component;
   updating the component of the virtualization system at the determined update time;
   preventing new sessions from launching by the at least one end user of each of the plurality of tenants during the updating; and allowing existing sessions by the at least one end user of each of the plurality of tenants to the virtualization system to continue while the updating is being performed, wherein the virtualization system outputs a retry return message to each of the plurality of tenants outputting an access request to the virtualization system while the updating is being performed, to thereby spoof the plurality of tenants into not having to resubmit the access request after not having received a response to the access request prior to a predetermined time after having outputting the access request.

2. The method of claim 1, wherein the analyzing comprises:
determining a specific time period comprising N consecutive days of a year, as compared to all other non-overlapping time periods of a year having a same time length as the specific time period, wherein N is an integer greater than one, when at least one session launch was initiated by the at least one end user of each of the plurality of tenants over the specific time period.

3. The method of claim 1, wherein analyzing comprises:
determining a specific time period of a day, as compared to all other non-overlapping time periods of the day having a same time length as the specific time period, when at least one session launch was initiated by the at least one end user of each of the plurality of tenants over a predetermined time period comprising a plurality of days.

4. The method of claim 3, wherein determining the update time comprises:
determining the estimated length of time based on historical data associated with the component;
wherein updating a component comprises:
determining a specific time period based in part on: a) the estimated length of time, and b) a number of session launches initiated during the specific time period.

5. The method of claim 3, wherein determining comprises:
determining the update time as the specific time period of a day having a least number of session launches, as compared to all other time periods of the day having a same time length as the specific time period, initiated by the at least one end user of each of the plurality of tenants over the predetermined time period comprising the plurality of days.

6. The method of claim 1, wherein updating the component comprises:
updating one or more of a delivery controller, a broker service, and a broker agent.

7. The method of claim 1, wherein analyzing comprises:
analyzing the session launch data for high and low session launch activity.

8. One or more non-transitory computer readable media storing instructions that, when executed by a virtualization system provided for a plurality of tenants, in which each tenant comprises at least one end user, cause the virtualization system to:
query, from a database, session launch data for the at least one end user of each of the plurality of tenants;
analyze the session launch data for session launch activity;
determine an update time for updating a component of the virtualization system based on the analysis of the session launch data and based on an estimated length of time needed to update the component;
update a component of the virtualization system at the determined update time;
prevent new sessions from launching by the at least one end user of each of the plurality of tenants during the update; and
allow existing sessions by the at least one end user of each of the plurality of tenants to the virtualization system to continue while the updating is being performed, wherein the virtualization system outputs a retry return message to each of the plurality of tenants outputting an access request to the virtualization system while the updating is being performed, to thereby spoof the plurality of tenants into not having to resubmit the access request after not having received a response to the access request prior to a predetermined time after having outputting the access request.

9. The one or more non-transitory computer readable media of claim 8, wherein the determine comprises:
determining a specific time period comprising N consecutive days of a year, as compared to all other non-overlapping time periods of a year having a same time length as the specific time period, wherein N is an integer greater than one, when at least one session launch was initiated by the at least one end user of each of the plurality of tenants over the specific time period.

10. The one or more non-transitory computer readable media of claim 8, wherein analyze the session launch data comprises:
determine a specific time period of a day, as compared to all other non-overlapping time periods of the day having a same time length as the specific time period, when at least one session launch was initiated by the at least one end user of each of the plurality of tenants over a predetermined time period comprising a plurality of days.

11. The one or more non-transitory computer readable media of claim 10, wherein determine the update time comprises:
determine the estimated time amount needed to update the component;
wherein update a component comprises:
determine a specific time period based in part on:
a) the estimated time amount, and b) a number of session launches initiated during the specific time period.

12. The one or more non-transitory computer readable media of claim 10, wherein determine an update time comprises:
determine the update time as the specific time period of a day having a least number of session launches, as compared to all other non-overlapping time periods of the day having a same time length as the specific time period, initiated by the at least one end user of each of the plurality of tenants over the predetermined time period comprising the plurality of days.

13. The one or more non-transitory computer readable media of claim 8, wherein update the component comprises:
update one or more of a delivery controller, a broker service, and a broker agent.

14. The one or more non-transitory computer readable media of claim 8, wherein the session launch data comprises:
analyze the session launch data for high and low session launch activity.

15. A computer-implemented method for a virtualization system accessible by a plurality of end users associated with a plurality of tenants, the method comprising:

storing session launch data associated with the plurality of end users;

retrieving the session launch data from a session database;

analyzing the session launch data for session launch activity, and determining an update time for updating a component of the virtualization system for at least one tenant of the plurality of tenants based on the analysis and based on an estimated length of time needed to update the component;

updating a component of the virtualization system at the determined update time;

during the updating of the virtualization system, preventing new sessions by one or more of the plurality of end users for accessing the virtualization system from launching; and allowing existing sessions by at least one end user of the plurality of end users to the virtualization system to continue while the updating is being performed, wherein the virtualization system outputs a retry return message to the at least one tenant outputting an access request to the virtualization system while the updating is being performed, to thereby spoof the at least one tenant into not having to resubmit the access request after not having received a response to the access request prior to a predetermined time after having outputting the access request.

16. The computer-implemented method of claim 15, wherein the analyzing comprises analyzing the session launch data by determining a specific time period of a day, as compared to all other non-overlapping time periods of the day having a same time length as the specific time period, when at least one session launch was initiated by the plurality of end users over a predetermined time period comprising a plurality of days.

17. The computer-implemented method of claim 16, wherein determining the update time comprises:

determining the estimated time amount needed to update the component;

wherein updating a component comprises:

determining a specific time period based in part on:

a) the estimated time amount, and b) a number of session launches initiated during the specific time period.

18. The computer-implemented method of claim 15, wherein analyzing comprises analyzing the session launch data by determining the update time as a specific time period of a day having a least number of session launches, as compared to all other non-overlapping time periods of the day having a same time length as the specific time period, initiated by the plurality of end users over a predetermined time period comprising a plurality of days.

* * * * *